Nov. 23, 1965   F. S. KASPER   3,219,899
REVERSE CURRENT MOTOR CIRCUIT INCLUDING DYNAMIC BRAKING
Filed Feb. 19, 1963
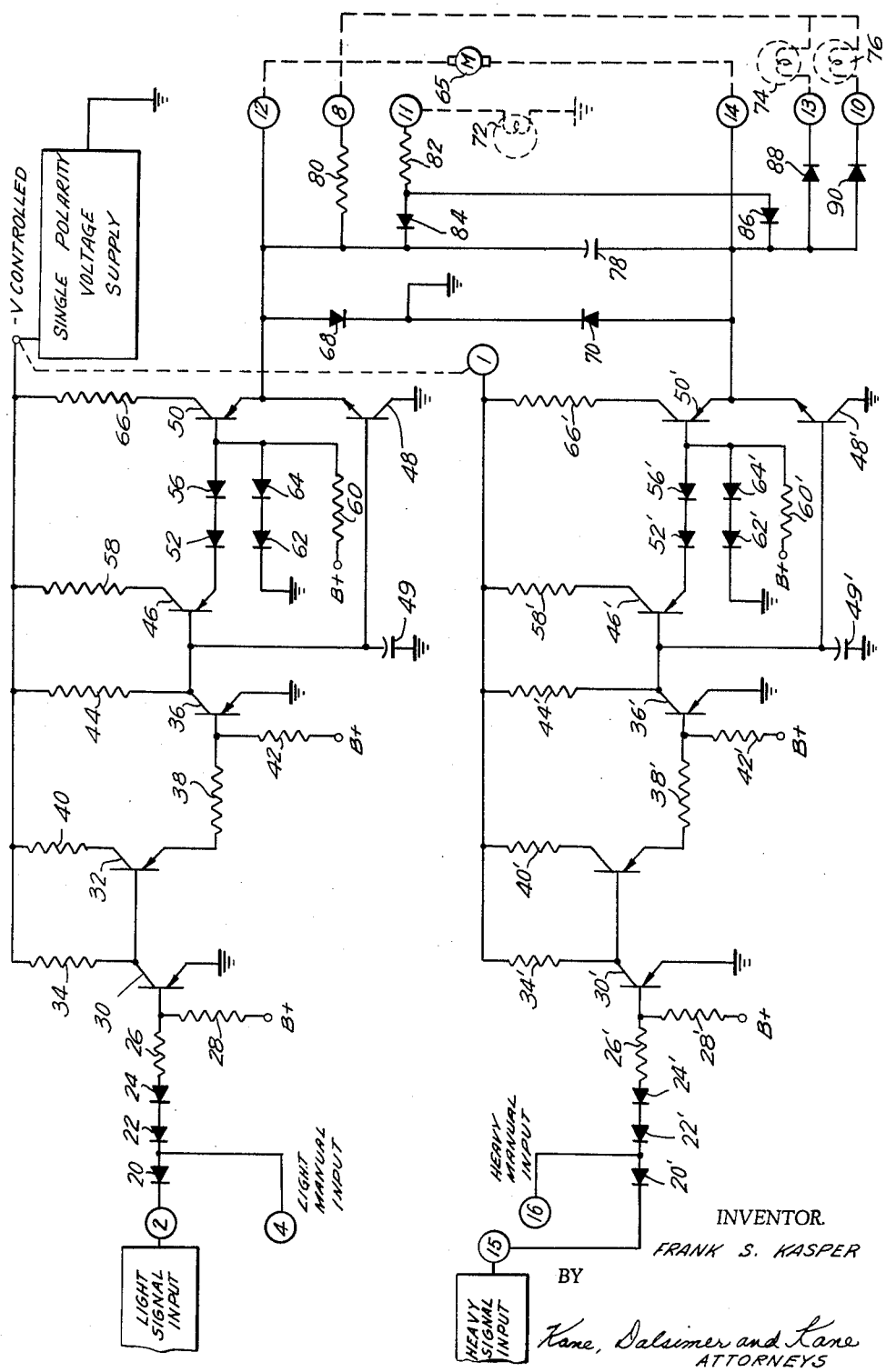
INVENTOR.
FRANK S. KASPER
BY
Kane, Dalsimer and Kane
ATTORNEYS

United States Patent Office 3,219,899
Patented Nov. 23, 1965

3,219,899
REVERSE CURRENT MOTOR CIRCUIT INCLUDING DYNAMIC BRAKING
Frank S. Kasper, Hazel Crest, Ill., assignor to Amtron, Incorporated, Midlothian, Ill., a corporation of Illinois
Filed Feb. 19, 1963, Ser. No. 259,650
2 Claims. (Cl. 318—291)

This invention relates to reverse current circuitry and, more particularly, to a single wire-single polarity reverse current circuit.

Many applications today dictate the use of reverse current circuitry for accomplishing an intended purpose. For example, motor drives requiring rotational reversals particularly in connection with feed back control and servomechanisms rely upon current reversal circuits. Modern trends in core memory systems lean to the use of smaller and smaller cores. Naturally, the number of wires that can be strung through a core is limited. As the size of core decreases, the task of stringing cores becomes increasingly difficult. The present invention has application to these and related areas.

It is, therefore, an object of the present invention to provide a single wire-single polarity reverse current circuit which eliminates the requirement for two separate voltage supplies of different polarities; and, at the same time, in the mentioned core memory system application, decreases by at least half the required number of wires passing through cores.

In feeding and then segregating certain products that are to be ultimately packaged as predetermined weight units, the nature of the product may be such that a constant rate of feed may not, at all times, provide the prescribed weight per unit. This has occurred frequently in the processing of cold cuts for consumption. In such instances, it may be practical to regulate or control the feeding mechanism in such a manner that the product per unit weight will fall within preset tolerances. In this connection, in processing and packaging powdered or granular materials as well as sliced products in the food and meat packaging industry wherein it is desired to have a prescribed weight packaged units, product density is usually an uncontrolled variable. In these particular product processing operations, it will be most expedient to change the rate of feed of the product; and thusly, notwithstanding density changes, the unit weight registered by a scale will fall within prescribed tolerances. Accordingly, when it is desired to increase the unit weight more material is delivered to the scale before the product is segregated. Under such circumstances, the weight registered by the scale must provide intelligence capable of being automatically transferred to the feed mechanism for proper action.

Exemplary means for interpreting registered weight and then relaying this information for corrective purposes are dislosed in application Serial No. 93,634, filed March 6, 1961 entitled Apparatus for Stacking and Weighing Sliced Food Products and now Patent No. 3,099,304 granted July 30, 1963, application Serial No. 130,982 filed August 11, 1961 entitled Apparatus for Stacking and Weighing Sliced Food Products, Serial No. 245,833 filed December 19, 1962 entitled Improvements in Apparatus for Stacking and Weighing Sliced Food Products and application Serial No. 240,392, filed November 27, 1962 entitled Apparatus for Processing Electrical Signals and now Patent No. 3,162,326 granted December 22, 1964. The relayed or transferred information may actuate a servo-mechanism which either increases or decreases the rate of advance of the feeding mechanism dependent upon the direction of error registered by the scale. An exemplary servo-mechanism to which the present invention is applicable is disclosed in the above application Serial No. 245,833 in which a reversible motor serves to adjust the flow control valve of a hydraulic system operating the product feed.

Another object is to provide improved means for automatically adjusting valve settings, either manually or automatically, in accordance with prescribed intelligence signals.

In accordance with the exemplary embodiment disclosed herein, the circuitry of this invention contains two signal amplifying and switch actuating channels for driving a motor which could provide adjustment of a flow control valve as indicated in the above. The circuitry, in general, includes a pair of inputs, an output load which, in the disclosed case, is a motor and a single polarity voltage source supplying power to the load. As will be fully appreciated shortly, if one of the inputs is energized while the other is not, current flows through the load in one direction. On the other hand, if the other input is energized while the former is inoperative, then current flows through the load in the opposite direction. If both inputs are energized simultaneously, no current flows through the load.

Other objects and advantages will become apparent from the following detailed description of the invention which is to be taken in conjunction with the accompanying drawing diagrammatically illustrating a somewhat preferred embodiment of circuitry which, as shown, may be applied to the reversal of a motor upon receipt of predetermined signals.

The illustrated circuitry may assume the form of a printed circuit card, if desired, and includes two identical channels, one having an input at terminal 2 and the other an input at terminal 15. The explanation and description for one channel, accordingly, equally applies to the other. For this reason, corresponding parts will be identified in the second channel with primes.

The input signals would generally be in the form of a timed pulse. Circuitry for applying a certain pulse width proportional to an error to be corrected is disclosed in the above application Serial No. 240,392, now Patent Number 3,162,326. The signal is suitably amplified by transistor amplifier circuitry to actuate a transistor switch. Depending upon the particular channel receiving the signal, this switch will connect the load to the power source to operate the load in a certain direction. If the other channel receives the signal, the load is actuated in the reverse direction. Upon removal of the timed pulse, provisions are made for immediate braking of load actuation.

Diodes 20, 22 and 24 provide a blocking path so that low voltage levels that may appear at pin 2 do not operate this channel. Naturally, more or fewer diodes, in number, may be introduced depending upon the expected low voltage levels. It is a fairly well known fact that silicon diodes do not conduct in the forward direction until the voltage across the diode exceeds approximately 0.5 volt. Therefore, in the illustrated embodiment, approximately 1.5 volts must exist at terminal 2 before the diodes will conduct.

Resistor 26 provides current limiting and a high impedance to the voltage signal applied to terminal 2. A resistor 28 is coupled with the base of transistor 30 and is used to anti-bias this transistor in the off condition.

The transistor 30 is an inverter and is directly coupled to the emitter follower transistor 32. Resistor 34 is a collector load resistor for transistor 30 with current passing through this resistor to transistor 32 when transistor 30 is turned off. Transistor 32 supplies current to transistor 36 through the current limiting resistor 38. The resistor 40 is used to prevent a semi-conductor path between the supply voltage and ground through transistors 32 and 30 to prevent "thermal runaway." Resistor 42 provides anti-bias to transistor 36 to maintain it in the off condition bearing in mind that this transistor is another inverter stage operating at a higher power level. Resistor 44 serves as the collector load for this transistor.

The output of transistor 36 drives transistors 46 and 48 directly. When transistor 36 is biased off, it anti-biases transistor 48 and supplies a voltage to the base of transistor 46 thereby turning this transistor on. When transistor 36 is turned on, it biases transistor 46 off and clamps the base of transistor 48 to ground across capacitance 49 so that a negative voltage appears at the emitter of transistor 48 thereby holding this point near ground potential.

Transistor 46 is an emitter follower which drives transistor 50 through diodes 52 and 56 and presents a high impedance to transistor 36. Resistor 58 is used to prevent a semi-conductor path between supply voltage and ground through transistors 46 and 36 to prevent thermal runaway. Diodes 52 and 56 are used to prevent transistor 46 from conducting because of the anti-bias voltage supplied to the base of transistor 50 by resistor 60. Diodes 62 and 64 anti-bias the base of transistor 50 at a relatively low voltage which, in a particular application of this circuit, approximates plus 1.3 volts. Otherwise, the tendency would be for transistor 46 to turn on if diodes 52 and 56 were not present. If this voltage was higher, transistor 46 would tend to conduct and, if this voltage was lower than transistor 50, would tend to dissipate power when the circuit dynamically brakes the motor 65. Resistor 66 is a current limiting resistor which also serves to interrupt the semi-conductor path to transistors 50 and 48. Diodes 68 and 70 clamp the positive side of the motor 65 to ground when it performs as a generator while it is coasting.

Pins 4 and 16 provide inputs for negative voltage from switches (not shown) to manually control the motor 65, if desired.

If input pins 2 or 4 are supplied with a negative voltage, transistor 36 is turned off and its collector voltage rises negatively. The emitters of transistors 46 and 50 follow this voltage with small voltage drops across diodes 52 and 56. The negative voltage is applied to the motor 65 through terminal 12. The other end of the motor 65 returns through pin 14 to the emitter of transistor 48' to ground. Indicator lamps 72, 74 and 76 are used to display the action of the motor 65. The heavy lamp 74 glows when pin 14 supplies a negative voltage and the light 76 glows when pin 12 supplies a negative voltage. The lamp 72, connected to pin 11, glows when either the heavy or light lamp is energized. When the channel associated with input pin 15 is energized, the description above applies only when the action of two channels is reversed.

Capacitor 78 is placed across the motor 65 to suppress commutator arcing and noise. Resistors 82 and 80 are current limiting resistors whereas diodes 84, 86, 88 and 90 serve in a filter capacity.

Thus, when a negative signal is applied to the pin 2 or 4 and not pin 15 and 16, transistor 50 supplies a negative voltage to pin 12. Negative current then flows through the motor 65 from pin 12 to pin 14. The ground return for this current is through pin 14 into the emitter of transistor 48' to the collector to ground. The motor 65 is then turned in a direction to cause a servo-mechanism, for example, to respond proportionately to the signal applied to the channel. At the same time, negative current flows through diode 84 through resistor 82 to energize the lamp 72. Simultaneously, negative current flows through resistor 80, the light lamp 76, diode 90, the transistor 48' to ground. This causes the light lamp to glow.

When the input to pin 2 or 4 is removed, the motor 65 coasts and performs as a generator in view of the absence of a negative voltage supply emanating from transistor 50. This generator action causes the lead associated with pin 12 to remain negative and the lead associated with pin 14 to swing positive. This negative voltage on pin 12 is clamped to ground by transistor 48 whereas the positive voltage is clamped to ground by diode 70. This action places a short circuit across the motor 65 and brakes the motor to a quick stop thereby assuring precise and accurate adjustment of the mechanism served by the motor.

When a negative signal is applied to pin 15 or 16, and in the absence of a negative signal at pin 2 or 4, transistor 50' supplies a negative voltage to pin 14. Negative current will then flow through the motor from pin 14 to pin 12. The ground return for this current is through pin 12 into the emitter of transistor 48 to the collector and ultimately to ground. The motor 65, accordingly, turns in a direction to cause reverse adjustment of the mechanism served thereby. Simultaneously, therewith, negative current flows through diode 86 through resistor 82 to light lamp 72. At the same time, negative current flows through diode 88, the heavy lamp 74, resistor 80, transistor 48 to ground. This causes the heavy lamp 74 to glow.

When the input to pin 15 or 16 is removed, the motor 65 coasts and performs as a generator because, at such time, a negative voltage is not supplied by transistor 50'. This generator action causes the lead associated with pin 14 to remain negative and the lead associated with pin 12 to swing positive. This negative voltage on pin 14 is clamped to ground by transistor 48' with the positive clamped to ground by diode 68. This action places a short circuit across the motor 65 and brakes the motor to a quick stop in furtherance of the accurate adjustment of the serviced servo-mechanism.

Thus, among others, the aforenoted objects and advantages are most effectively attained. Although a single somewhat preferred embodiment of this invention has been disclosed herein, it is in no sense limited thereby; and its scope is to be determined by that of the appended claims.

I claim:

1. A two-channel control circuit for effecting the selective actuation of a direct current motor in either a forward or a reverse direction in response to an input signal being supplied to one or the other of said channels, for effecting the automatic and immediate braking of said motor when the desired actuation thereof has been effected and in response to the termination of an input signal that has been supplied to one of said channels, and for precluding said motor from being operated in the absence of an input signal being supplied to one or the other of said channels or when input signals are simultaneously supplied to both of said channels; which control circuit comprises a single polarity source of potential; means defining a first motor drive current supplying circuit between said single polarity source of potential and said motor; said first circuit defining means including a first amplifier circuit and a first switching circuit; means defining a second motor drive current supplying circuit between said single polarity source of potential and said motor; said second circuit defining means including a second amplifier circuit and a second switching circuit; said first and second circuit defining means being responsive to an input signal supplied to one of said channels to drive said motor in a first direction for the duration of said input signal and responsive to an input signal supplied to the other of said channels to drive said motor in a second and reverse direction; a first variable impedance braking network connected in circuit with said motor and including at least a portion of said first switching circuit; and a second variable impedance braking network connected in circuit with said motor and including at least a portion of said second switching circuit; said variable impedance braking networks providing essentially an open circuit condition to said motor when one of said motor drive current supplying circuits is completed in response of one of said amplifier circuits being rendered effective; said braking networks providing essentially a short circuit condition across said motor due to the generator action of said motor both upon termination of an input signal and when said motor is externally actuated in either a forward or reverse direction in the absence of an input signal.

2. A two-channel control circuit for effecting the selective actuation of a direct current motor in either a forward or a reverse direction in response to an input signal being supplied to one or the other of said channels, for effecting the automatic and immediate braking of said motor when the desired actuation thereof has been effected and in response to the termination of an input signal that has been supplied to one of said channels, and for precluding said motor from being operated in the absence of an input signal being supplied to one or the other of said channels or when input signals are simultaneously supplied to both of said channels; which control circuit comprises a single polarity source of potential; a first amplifier circuit connected between said single polarity source of potential and said motor; a first input circuit connected to said first amplifier circuit; a first switching circuit connected in circuit with said first amplifier circuit, said first input circuit, and said motor; a second amplifier circuit connected between said single polarity source of potential and said motor; a second input circuit connected to said second amplifier circuit; a second switching circuit connected in circuit with said second amplifier circuit, said second input circuit and said motor; a first motor drive current supplying circuit being defined by said first amplifier circuit and at least a portion of said second switching circuit in response to a signal being supplied to said first input circuit to render said first amplifier circuit effective so that said motor is driven in a first direction for the duration of said input signal; a second motor drive current supplying circuit being defined by said second amplifier circuit and at least a portion of said first switching circuit in response to an input signal being supplied to said second input circuit to render said second amplifier circuit effective so that said motor is driven in a second or reverse direction for the duration of said input signal; a first variable impedance braking network connected in circuit with said motor and including at least a portion of said first switching circuit; and a second variable impedance braking network connected in circuit with said motor and including at least a portion of said second switching circuit; said variable impedance braking networks providing essentially an open circuit condition to said motor when one of said motor drive current supplying circuits is completed in response of one of said amplifier circuits being rendered effective; said braking networks providing essentially a short circuit condition across said motor due to the generator action of said motor both upon termination of an input signal and when said motor is externally actuated in either a forward or reverse direction in the absence of an input signal.

References Cited by the Examiner
UNITED STATES PATENTS

| | | | |
|---|---|---|---|
| 2,606,312 | 8/1952 | Rogers | 318—293 |
| 2,615,152 | 10/1952 | Apple | 318—291 |
| 2,629,849 | 2/1953 | Barnes | 318—293 |
| 2,778,982 | 1/1957 | Loeffler | 318—257 |
| 3,022,454 | 2/1962 | Millis | 318—257 |
| 3,054,924 | 9/1962 | Wetzger et al. | 318—293 |
| 3,105,179 | 9/1963 | Young et al. | 318—293 |
| 3,144,598 | 8/1964 | Merritt | 318—257 |

MILTON O. HIRSHFIELD, *Primary Examiner.*